(12) United States Patent
Hyndman

(10) Patent No.: US 9,064,023 B2
(45) Date of Patent: Jun. 23, 2015

(54) PROVIDING WEB CONTENT IN THE CONTEXT OF A VIRTUAL ENVIRONMENT

(75) Inventor: Arn Hyndman, Ottawa (CA)

(73) Assignee: AVAYA INC., Basking Ridge, NJ (US)

( * ) Notice: Subject to any disclaimer, the term of this patent is extended or adjusted under 35 U.S.C. 154(b) by 1166 days.

(21) Appl. No.: 12/345,092

(22) Filed: Dec. 29, 2008

(65) Prior Publication Data

US 2010/0169837 A1 Jul. 1, 2010

(51) Int. Cl.
*G06F 3/048* (2013.01)
*G06F 17/30* (2006.01)
*G06F 3/0481* (2013.01)

(52) U.S. Cl.
CPC ...... *G06F 17/30882* (2013.01); *G06F 3/04815* (2013.01); *G06F 17/30887* (2013.01); *G06F 2203/04804* (2013.01)

(58) Field of Classification Search
CPC .......................... G06F 3/04815; G06T 19/003
USPC ................. 715/201, 205, 207, 706, 802, 803; 709/202, 245; 705/26.1, 26.43, 26.5, 705/26.9, 27.1, 27.2, 14.25
See application file for complete search history.

(56) References Cited

U.S. PATENT DOCUMENTS

| | | | |
|---|---|---|---|
| 6,175,842 B1 | 1/2001 | Kirk et al. | |
| 6,909,429 B2 | 6/2005 | Gottesman et al. | |
| 2002/0113809 A1* | 8/2002 | Akazawa et al. | 345/706 |
| 2004/0193441 A1* | 9/2004 | Altieri | 705/1 |
| 2004/0225749 A1* | 11/2004 | Pavlik et al. | 709/245 |
| 2005/0216346 A1 | 9/2005 | Kusumoto et al. | |
| 2007/0179867 A1* | 8/2007 | Glazer et al. | 705/27 |
| 2007/0282695 A1 | 12/2007 | Toper et al. | |
| 2008/0163379 A1 | 7/2008 | Robinson et al. | |
| 2008/0204449 A1 | 8/2008 | Dawson et al. | |
| 2008/0288855 A1* | 11/2008 | Issler et al. | 715/205 |
| 2008/0307473 A1 | 12/2008 | Allen | |
| 2008/0313038 A1 | 12/2008 | Wajihuddin | |
| 2009/0112970 A1* | 4/2009 | Dawson et al. | 709/202 |

(Continued)

FOREIGN PATENT DOCUMENTS

WO WO2009/000028 12/2008

OTHER PUBLICATIONS

U.S. Appl. No. 61/203,057 for Beaton et al. (US 2010/0153831 A1). Dec. 16 2008 "61203057.pdf" 34 pages.*

(Continued)

*Primary Examiner* — Haoshian Shih
(74) *Attorney, Agent, or Firm* — Anderson Gorecki & Rouille LLP

(57) ABSTRACT

Information URLs may be associated with three dimensional objects in a three dimensional virtual environment. When a URL is selected, an overlay web rendering engine renders a web page associated with the URL over the object in the three dimensional virtual environment. The web page may include rich content, interactive content, or any other type of web content supported by the user's local browser and browser plugging. The user may interact with the content in the overlay web rendering engine to obtain successive layers of content or to affect the object in the virtual environment. The web page is rendered with a transparent background so that the three dimensional content of the virtual environment continues to be visible through the web page and provides context for the overlayed content. Information URLs may be used to provide information about objects, Avatars, or the virtual environment itself.

25 Claims, 8 Drawing Sheets

(56) References Cited

U.S. PATENT DOCUMENTS

| | | | |
|---|---|---|---|
| 2009/0132952 A1* | 5/2009 | Wong | 715/781 |
| 2009/0138375 A1* | 5/2009 | Schwartz | 705/27 |
| 2009/0158151 A1* | 6/2009 | Cheng et al. | 715/706 |
| 2009/0165140 A1* | 6/2009 | Robinson et al. | 715/757 |
| 2009/0213116 A1* | 8/2009 | Konev et al. | 345/420 |
| 2010/0153831 A1* | 6/2010 | Beaton | 715/201 |

OTHER PUBLICATIONS

Written Opinion of the International Searching Authority from corresponding PCT application PCT/CA2009/000380.

* cited by examiner

PROVIDING WEB CONTENT IN THE CONTEXT OF A VIRTUAL ENVIRONMENT

CROSS-REFERENCE TO RELATED APPLICATIONS

None

BACKGROUND OF THE INVENTION

1. Field of the Invention

The present invention relates communication sessions and, more particularly, to a method and apparatus for providing web content in the context of a virtual environment.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, business collaboration, and other types of interactions between groups of users and between businesses and users.

As Avatars encounter other Avatars within the virtual environment, the participants represented by the Avatars may elect to communicate with each other. For example, the participants may communicate with each other by typing messages to each other or an audio bridge may be established to enable the participants to talk with each other.

There are times when it would be advantageous to be able to learn more about particular objects encountered in a virtual environment. Conventionally this has been done by enabling a tooltip style popup to be used to present additional information about particular objects in the virtual environment. For example if the Avatar came across an unknown object, by moving the mouse cursor over the object the object name or a property of the object may be shown to the user. This solution does not provide significant information about the object, and hence is of limited utility. Additionally, the information about the object may not be easily changed or updated since the information is contained within the three dimensional virtual environment and served to the user from the virtual environment server.

Another way that additional information may be made available is to provide a drop-down menu instead of a tool-tip. For example, a property browser may enable a user to view or edit a dynamic list of properties associated with a three dimensional object. However, this mechanism has significant limitations, since the available information is limited to the content of the drop down menu. Also, since the content is internal to the virtual environment, updating the content requires access to the virtual environment code.

Some systems also allow specific actions or object types to have a URL associated with them. When the user encounters an object of this nature, the user may click on the URL to have an external web browser launched in a pop-up window. Additional information about the object may then be displayed about the object in the external pop-up. Unfortunately, this solution does not enable the content that is shown in the web browser to be easily associated with a particular part of the three dimensional object. Where there are multiple URLs associated with the object, it may be difficult for the user to determine what content is associated with which aspect of the object. Particularly if each URL causes a new window to open, the user may lose track of which window is associated with particular parts of the three dimensional object.

SUMMARY OF THE INVENTION

Information URLs may be associated with three dimensional objects in a three dimensional virtual environment. The information URLs may be associated with the objects as a whole or with a particular aspect of a particular object. When the user views, focuses on, clicks on, or otherwise indicates that additional information is required about the object, an overlay web rendering engine renders a web page associated with the URL over the object in the three dimensional virtual environment. The web page may include rich content, interactive content, or any other type of web content supported by the user's local browser and browser plugging. The user may interact with the content in the overlay web rendering engine to affect the object and may continue to interact with the object to affect the overlay web rendering engine content. The web page is rendered with a transparent background so that the three dimensional content of the virtual environment continues to be visible through the web page and provides context for the web page. The three dimensional virtual environment may be frozen while the web page is overlayed on the content or, alternatively, the user may be allowed to continue to move within the virtual environment while viewing the web content. In this embodiment, as the user's Avatar moves within the virtual environment the web page will remain centered over the associated object and panned such that, as the user's point of view shifts, the web content stays over the three dimensional content. Overlaying the web content enables the content to be naturally associated with particular parts of the three dimensional content of the virtual environment, so that web based content may be used to provide additional information about particular aspects of objects and Avatars within the virtual environment.

In one embodiment, the virtual environment server records and broadcasts a Uniform Resource Locator (URL), and optionally clipping parameters, that are to be used to render information associated with an object in a virtual environment. In this embodiment, the URL is provided within the virtual environment and references content that is located outside of the virtual environment. Thus, it is easy to update the content since access to the virtual environment code is not required. When a user's Avatar encounters the object in the virtual environment, the client obtains the URL and can obtain the web content using a standard web browser. The web content is rendered inside the virtual environment as an overlay to the virtual environment having a transparent background. If a user interacts with the web content shown in the overlay, such as by selecting a link to a new web page, the URL associated with the link will be used to obtain the new web content which will then be rendered in the virtual environment by the overlay web rendering engine. Since the URLs are designed to provide information to the user about a particular object, the other users of the three dimensional virtual environment are not required to be provided with the information about the object unless they also select to use the URL to access the content. Accordingly, synchronization of the web content between users of the virtual environment is not required, as each user may elect to overlay whatever information they choose while interacting within the virtual environment.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
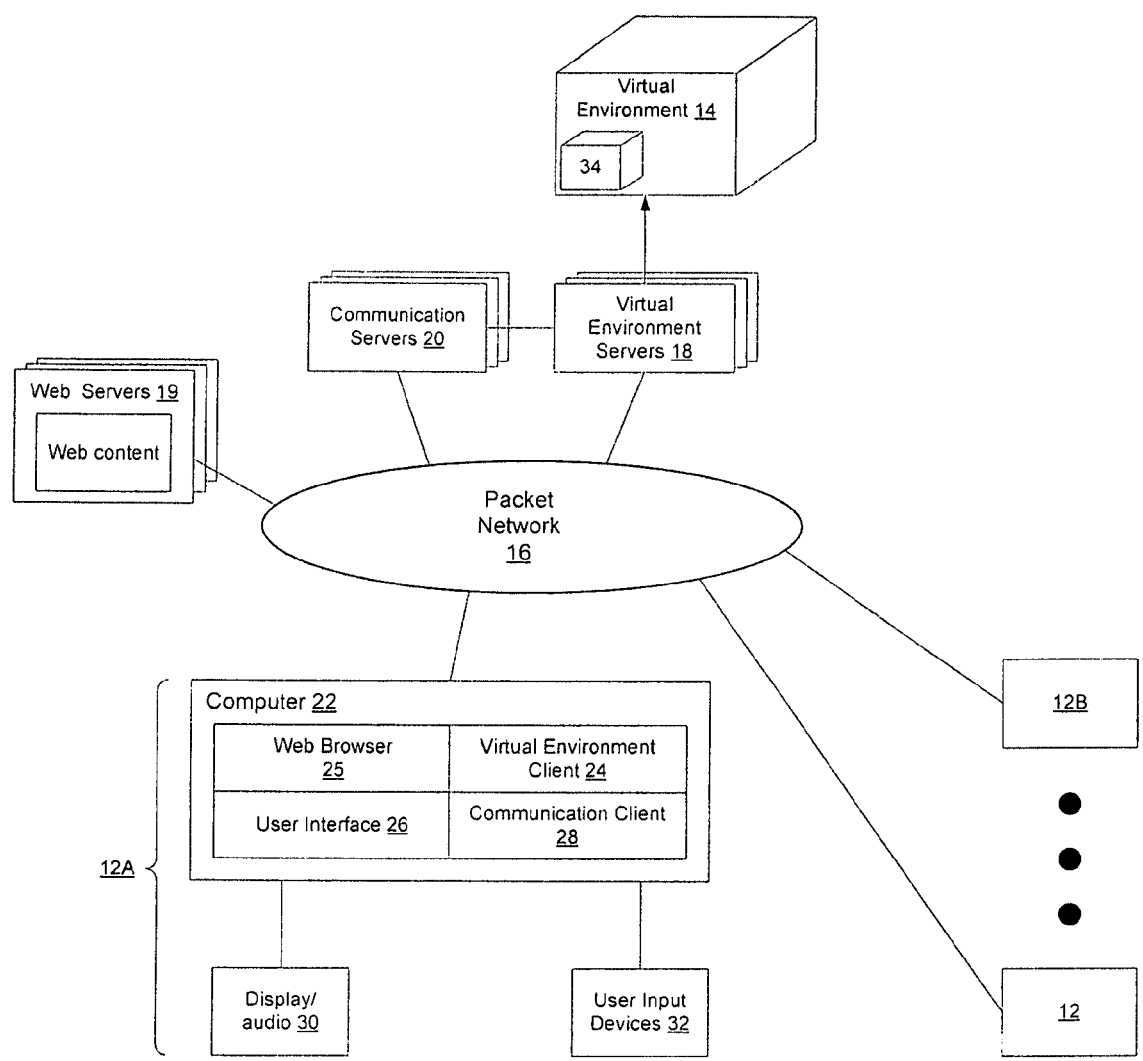
FIG. 1 is a functional block diagram of a portion of an example system that enables web content to be included in a three dimensional computer-generated virtual environment according to an embodiment of the invention.

FIG. 1 shows a portion of an example system 10 that may enable web content to be included in a three dimensional computer-generated virtual environment. In the example shown in FIG. 1, a user 12 may access the virtual environment 14 from their computer 22 over a packet network 16 or other communication infrastructure. The virtual environment 14 is implemented by one or more virtual environment servers 18. Communication sessions between the users 12 may be implemented by one or more communication servers 20.

The virtual environment may be implemented as using one or more instances, each of which may be hosted by one or more virtual environment servers. Where there are multiple instances, the Avatars in one instance are generally unaware of Avatars in the other instance. Conventionally, each instance of the virtual environment may be referred to as a separate World. Avatars in a given world are allowed to communicate with other users that also have Avatars in the same world over a communication session hosted by the communication server 20.

The virtual environment 14 may be any type of virtual environment, such as a virtual environment created for an on-line game, a virtual environment created to implement an on-line store, a virtual environment created to implement an on-line training facility, for business collaboration, or for any other purpose. Virtual environments are being created for many reasons, and may be designed to enable user interaction to achieve a particular purpose. Example uses of virtual environments include gaming, business, retail, training, social networking, and many other aspects.

Although an embodiment of the invention will be described in connection with enabling web content to be overlayed within a virtual environment application, other embodiments may be used in connection with other types of three dimensional applications to enable web content to be included in these other types of three dimensional applications. For example, Computer Aided Design CAD software is used by architects, engineers, and product designers to create three dimensional models. According to an embodiment, URLs may be associated with particular aspects of the three dimensional models to enable web content to be overlayed on the model when subsequently viewed using the CAD application. Similarly, three dimensional animation and web based 3D visualization software may not have Avatars, but do have 3D objects that the user manipulates and interacts with. Information URLs may be associated with these objects as desired to enable web content to be included in these software applications as well.

Generally, a virtual environment will have its own distinct three dimensional coordinate space. Avatars representing users may move within the three dimensional coordinate space and interact with objects and other Avatars within the three dimensional coordinate space. The virtual environment servers maintain the virtual environment and generate a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment.

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. In this way the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, fly or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

In the embodiment shown in FIG. 1, the user's computer also includes a web browser 25 designed to interact with web servers 19 over the network 16. The web browser may obtain web content from the web servers 19 to be displayed in a window shown on the user's display 30. Use of a web browser to obtain content from servers on a network such as the Internet is well known in the art.

According to an embodiment of the invention, as the user encounters objects in the virtual environment, the user may be provided with an opportunity to obtain more information about those objects in the form of web content. One or more information URLs may be associated with the object by the virtual environment server. The user may click on the URL or otherwise use the URL to obtain information associated with the URL. Rather than having the information mapped to a surface of the three dimensional virtual environment, the information is displayed in an overlay, such that the information is only viewable to the user who has interacted with the URL. Since the information is provided to the user via an overlay, the information is not viewable to other users of the three dimensional virtual environment. "Information URLs", as that term is used herein, will be used to refer to a URL that may be used to obtain information for presentation to the user that is not mapped to a three dimensional surface in the virtual environment. Information associated with an information URL is shown to the user that requested the information, and is not available to other users of the virtual environment unless they also access the information via the information URL. Thus, information URLs are different from other URLs, which may be used to cause web content to be mapped to a surface of the virtual environment and affect the virtual environment for other users.

Figure 2:
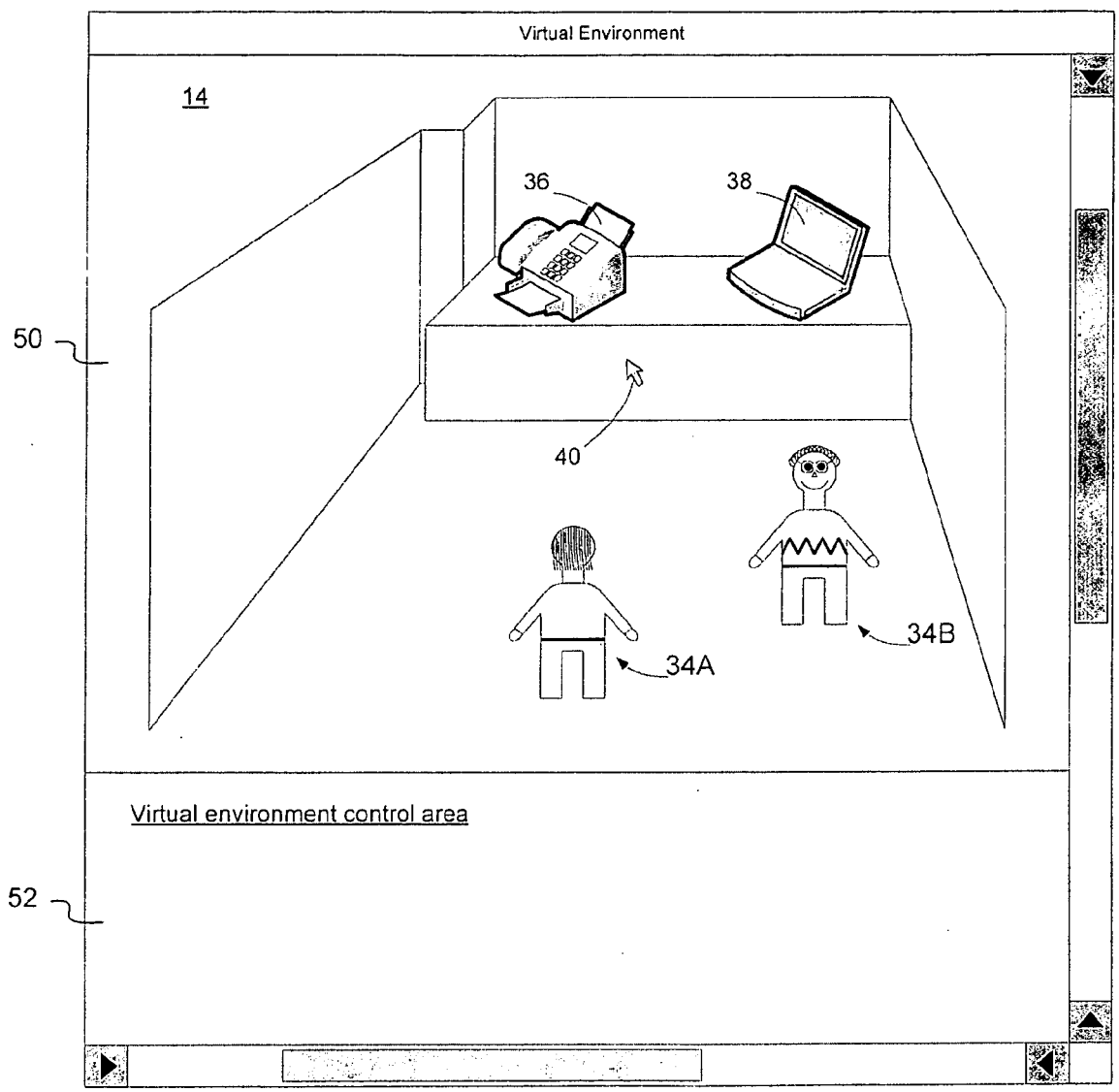
FIGS. 2-6 show several example virtual environments that illustrate how web content can be included in a three dimensional computer-generated virtual environment according to an embodiment of the invention.

FIG. 2 shows an example three dimensional computer-generated virtual environment. In this example, the virtual environment is shown as implemented in a virtual environment window that has a top viewing area 50 and a lower virtual environment control area 52. The virtual environment may alternatively be embedded in a web browser or otherwise implemented on the user's computer. In the example shown in FIG. 2, an Avatar 34A is shown standing in the entry to a retail establishment that is designed to sell fax machines 36 and laptop computers 38. Another Avatar 34B is also in the store.

It will be assumed for purposes of this example that one or more information URLs are associated with the fax machine 36 and that one or more other information URLs are associated with the laptop computer 38. A visual/audible indication may be used to indicate the presence of an information URL. For example, the object may be highlighted a different color, may be provided with a halo, a blinking light, or other visual or audible signal. The information URL presence signal may be continuous, or may only occur when the user passes their cursor over the object or looks directly at the object.

If the user associated with Avatar 34A would like to obtain more information about the fax machine, the user may move their cursor 40 over the fax machine and click on the fax machine. This is an example of direct user interaction with the information URL. Alternatively, the user's indirect interaction may be used to activate an information URL. For example, if the user looks at the object or looks directly toward the object, this indirect interaction may be sufficient to activate an information URL. For example, in first person point of view the Avatar's center of attention may be indicated by a set of cross-hairs. If the user's cursor (cross-hairs) remain over an object for a set length of time, a stare trigger may fire to bring up addition information about the object. Similarly, if the user looks away for a sufficient period of time, the overlay web browser may collapse. An Avatar may be considered to be looking at an object, in this context, when the object is close to the center of the user's display and the user is viewing the virtual environment in first person mode (as if looking through the Avatar's eyes). Other ways of activating an information URL to obtain the content associated with the information URL may be used as well.

Figure 3:
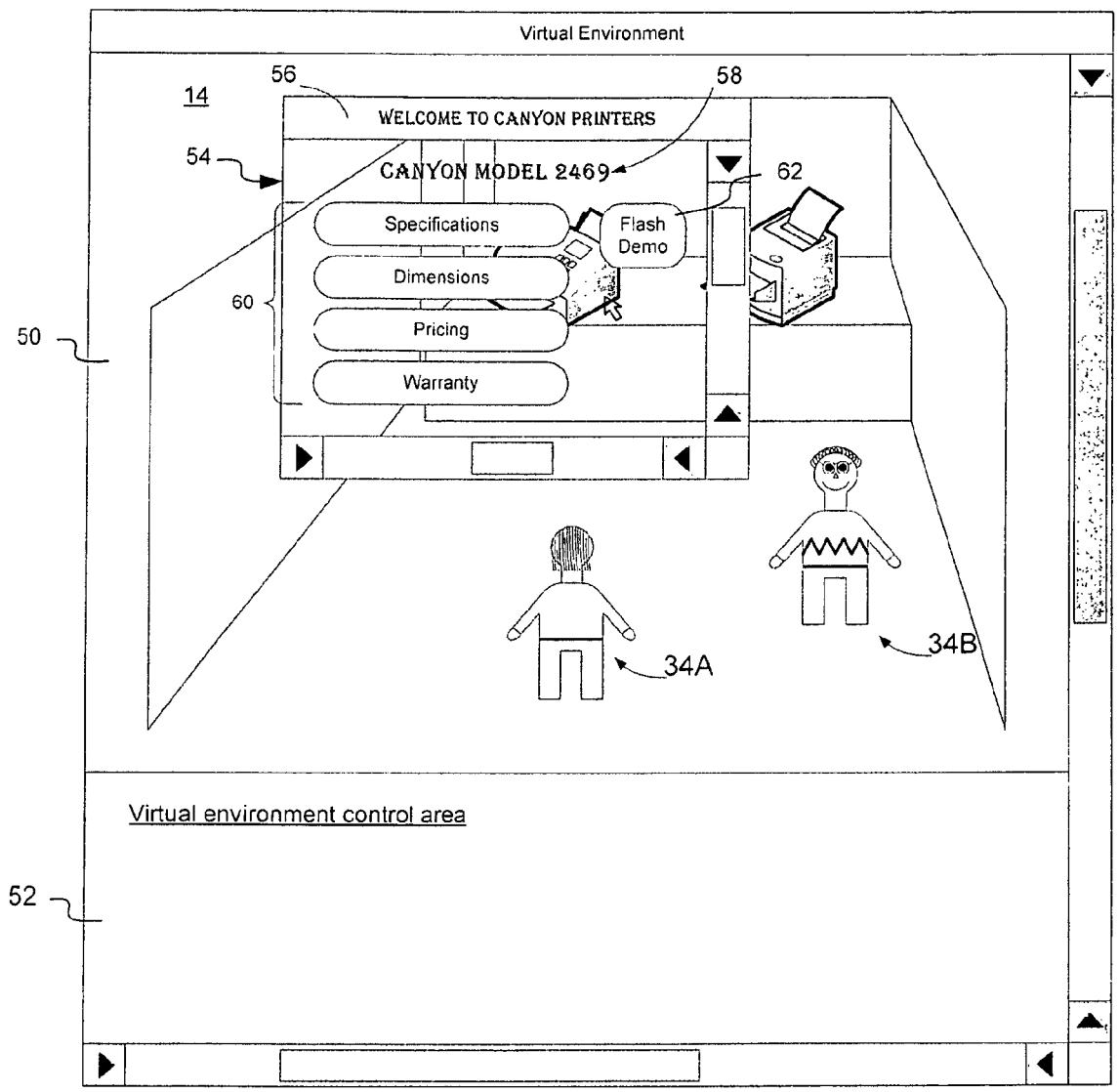

Assume that the user activates the information URL associated with the fax machine. FIG. 3 shows an example web content overlay that may be generated to provide additional information about the associated object. As shown in FIG. 3, when the user clicks or otherwise selects the information URL, an overlay web rendering engine 54 is added to the virtual environment centered above the underlying object. The overlay web rendering engine 54 is rendered with a transparent or translucent background so that the object is still visible below the information shown in the web browser. The information in the overlay web rendering engine is rendered locally, however, and not mapped as a texture to any surface in the three dimensional virtual environment. Accordingly, the information shown in the overlay is not visible to other users of the virtual environment. For example, the user associated with Avatar 34B is not provided with the information that is being shown to the user associated with Avatar 34A. Accordingly, coordination or synchronization of the information between the users' virtual environment clients is not required.

The overlay web rendering engine 54 in the example shown in FIG. 3 includes descriptive matter, such as an indication of the manufacturer 56, model number 58, and links to additional information 60. In the example web page, the manufacturer has included links to the specifications for the fax machine, the dimensions, the pricing, and warranty information. Of course this is merely an example set of links—the web page that is displayed may contain any information desired to be presented. Additionally, since the web page is being obtained from outside of the virtual environment, the content of the web page may be updated by the manufacturer without interacting with the virtual environment. Accordingly, updating the content that is to be provided in the virtual environment may be implemented by updating the web content stored on the web server. This makes it easy, for example, to implement sales campaigns, update model specifications, etc.

In the illustrated embodiment, the underlying object (the fax machine in this example), may be rendered by the virtual environment server or may itself be rendered by a separate virtual environment server supported by the manufacturer. For example, the virtual environment server may provide the user with a URL associated with the manufacturer's virtual environment server. The virtual environment client may use the URL to obtain the three dimensional computer-generated representation of the object to render the object within the three dimensional virtual environment. Thus, the object itself may be rendered using a server outside of the virtual environment server. How the object is rendered and where it is rendered from does not affect the information URLs.

Once an information URL is activated, the web page that is contained may include any type of content that is supported by the user's web browser. Since the overlay web rendering engine is launched and supported locally on the user's computer, the user may interact with the content shown in the overlay web rendering engine in a normal manner such as by clicking on the links 60 to obtain additional pages of information. Where the links are references to rich content such as FLASH video, the rich content will be available to the user as long as the user's browser has installed the appropriate plug-in for the particular type of rich content. In the illustrated example, the web page shown in the overlay web rendering engine includes a button 62 that the user may use to obtain a FLASH demonstration of the fax machine. Other types of content may be included as well.

By enabling web-based content to be associated with objects in the virtual environment, a nearly infinite amount of data may be associated with the object in the virtual environment when compared with the limited amount of data that can be provided to a user via a tooltip popup. Additionally, the content may be updated external of the virtual environment, so that the content is not linked to the virtual environment other than through the URL. This enables third parties to independently update the content without requiring the virtual environment owner to participate in the updating process.

The overlay web rendering engine makes it possible to dynamically and inexpensively add elements to the heads up display for a three dimensional visualization tool based on the context of viewed or selected three dimensional objects. Web content can be associated with parts of the three dimensional objects, and heads-up display elements can also trigger feedback into the three dimensional worlds to modify properties, trigger animations, and to cause other actions to occur in connection with the object in the virtual environment.

Figure 4:
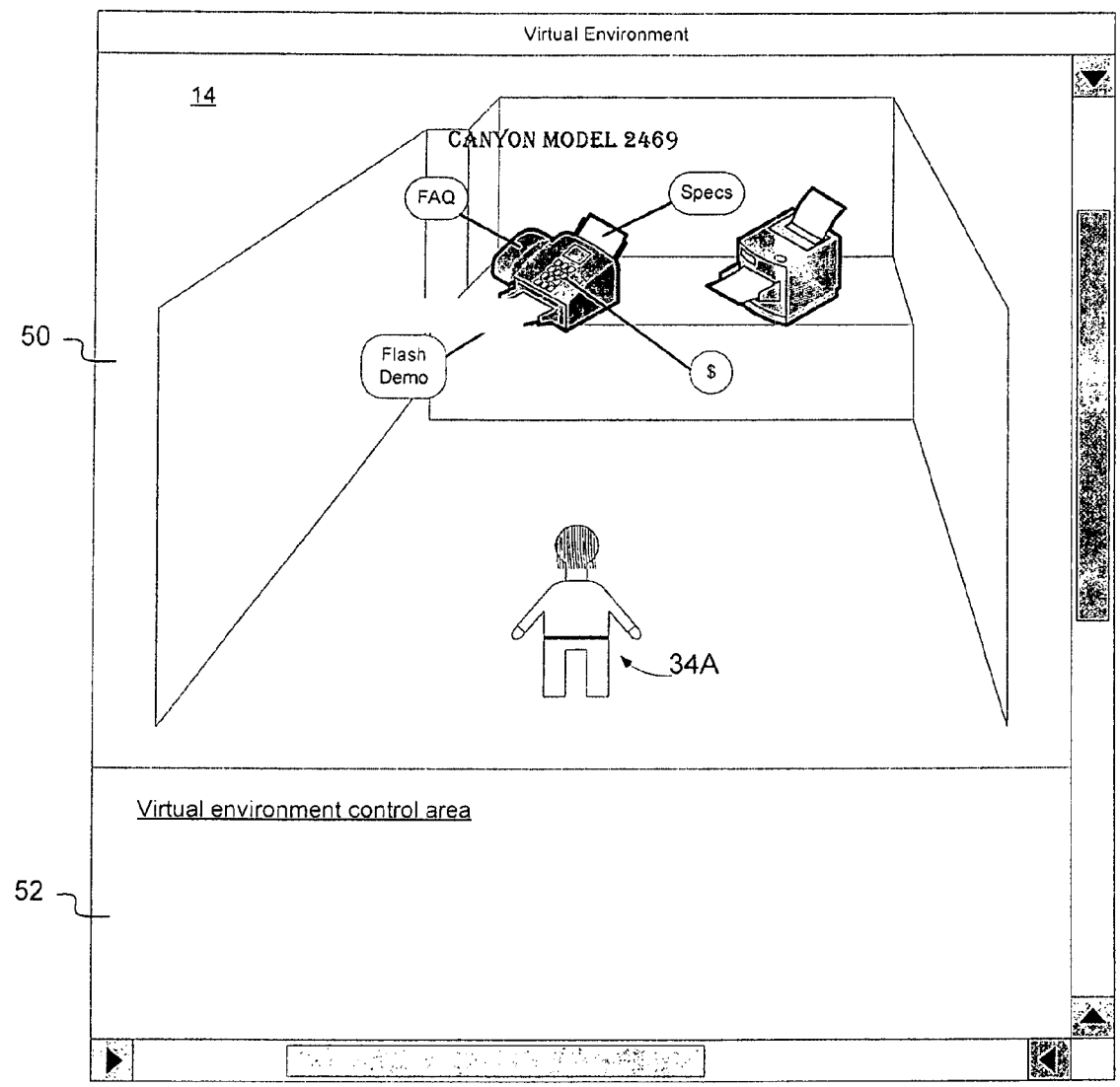

FIG. 4 shows another type of overlay web rendering engine that may be superimposed on the virtual environment. In this embodiment, the content of the web page is configured to point to particular aspects of the object. For example, the overlay web rendering engine may show a web page having a callout for frequently asked questions, specifications, pricing, and a flash demonstration of the product. The callouts have ends that are attached to the object at particular points. Depending on the location of the overlay web rendering engine, the tails of the pointers are adjusted so that they continue to appear to point to the same location on the object. The callouts may be implemented, if desired, using FLASH. Unlike the embodiment shown in FIG. 3, which included a title bar, borders, scroll bar, etc., the web content shown in the overlay of FIG. 4 is rendered alone without all the customary features of a traditional web browser. This makes the content feel much more integrated into the scene for the user.

The overlay web rendering engine is used to render the web page associated with a URL, complete with rich content and interactive content such as images, JavaScript, flash, video, and other types of content. The web page is rendered on a heads up display centered over the object that is associated with the URL. The web page is rendered with a transparent or semi-transparent background so that the three dimensional content is visible behind the web content. Thus, the web content acts as a contextual overlay for the object.

Either the three dimensional point of view is frozen such that the web content stays centered over the 3D object, or the web content may be panned such that, as the 3D point of view shifts, the web content stays over the 3D object. Overlaying the web content allows that content to be naturally associated with particular parts of the 3D object—content from the top of the rendered web content is naturally associated with the top of the 3D object. This allows for information call outs to be used in the web page that is rendered so that particular information may be provided and associated with particular aspects of the 3D object in the virtual environment.

The user can interact with the web based rich content and thus take actions that have impacts to the 3D content. A JavaScript-to-plug-in interface can be provided to create a direction interaction to 3D functions. For example, point of view controls, object properties, etc., may be embedded in the web page that is overlayed on the virtual environment and used to adjust the view of the object in the 3D virtual environment. In the embodiment shown in FIG. 4, for example, if the user were to click on one of the callout boxes describing a component of the 3D object, that component of the 3D object may be separated from the main 3D object, rotated, panned, or otherwise viewed, and additional information about the 3D object may be provided in a subsequent web page specific to that aspect of the 3D object.

Figure 5:
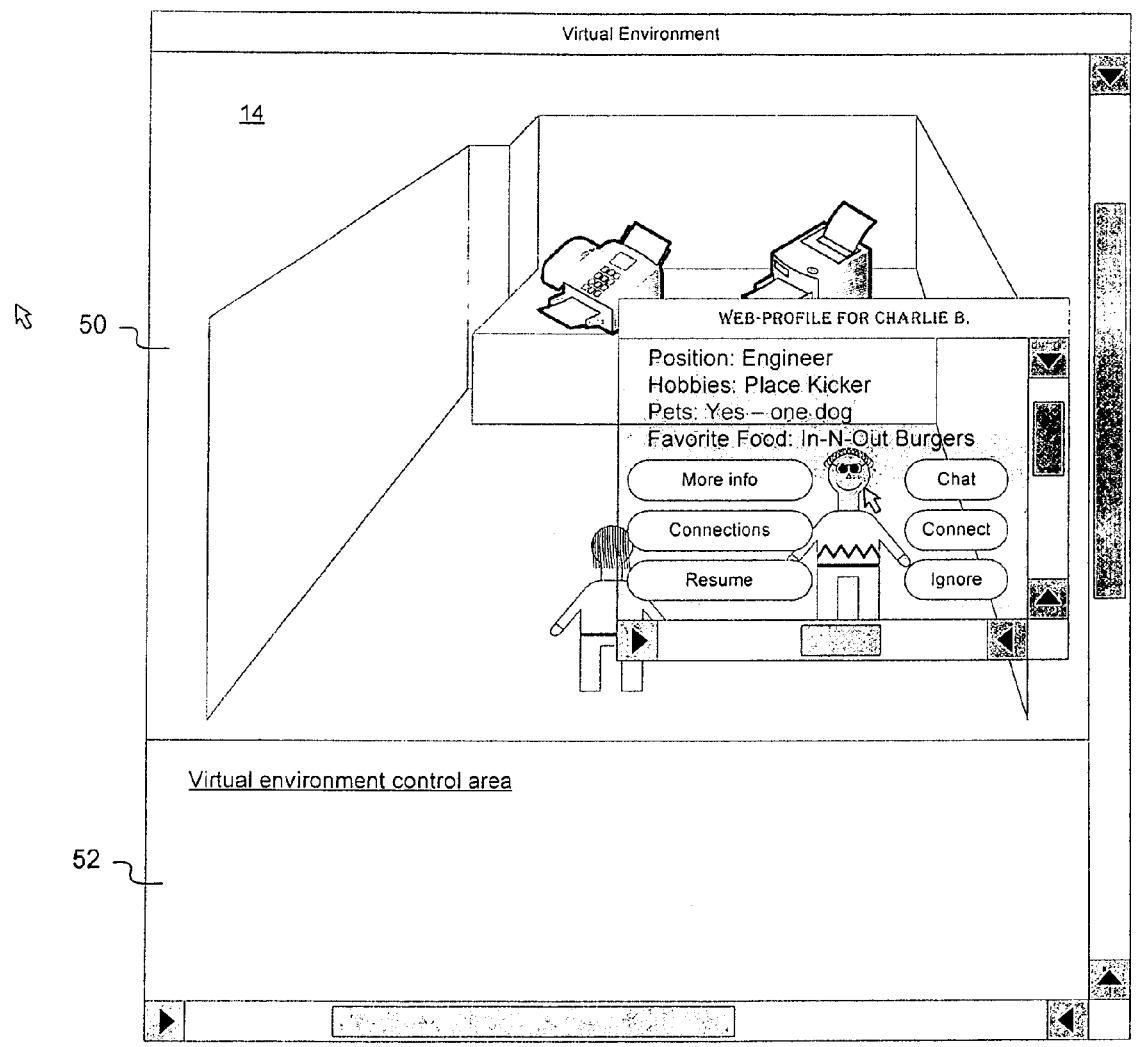

URLs may be associated with static objects as well as with animated objects such as Avatars. FIG. 5 shows an example in which a overlay web rendering engine has rendered a personal profile web page associated with Avatar 34B. As shown in this example, the personal web profile may provide any information that the user desires to provide. The personal profile web page may be made available from the user's virtual environment client, from a web server associated with the virtual environment, from an external social networking web server, or from another source. In the illustrated example, the web profile includes textual information about the user's name, job, hobbies, pets, favorite food, etc. Any desired information may be provided. The personal profile web page may also include links to enable the user to additional information about the other user, learn about the other user's social connections, see the user's resume (if the user is looking for a job). Any information that the user selects to include and makes available via the external web server may be provided via the personal profile web page. The personal profile page may also include one or more links that may be used to contact the person or to establish communication with the other user.

Figure 6:
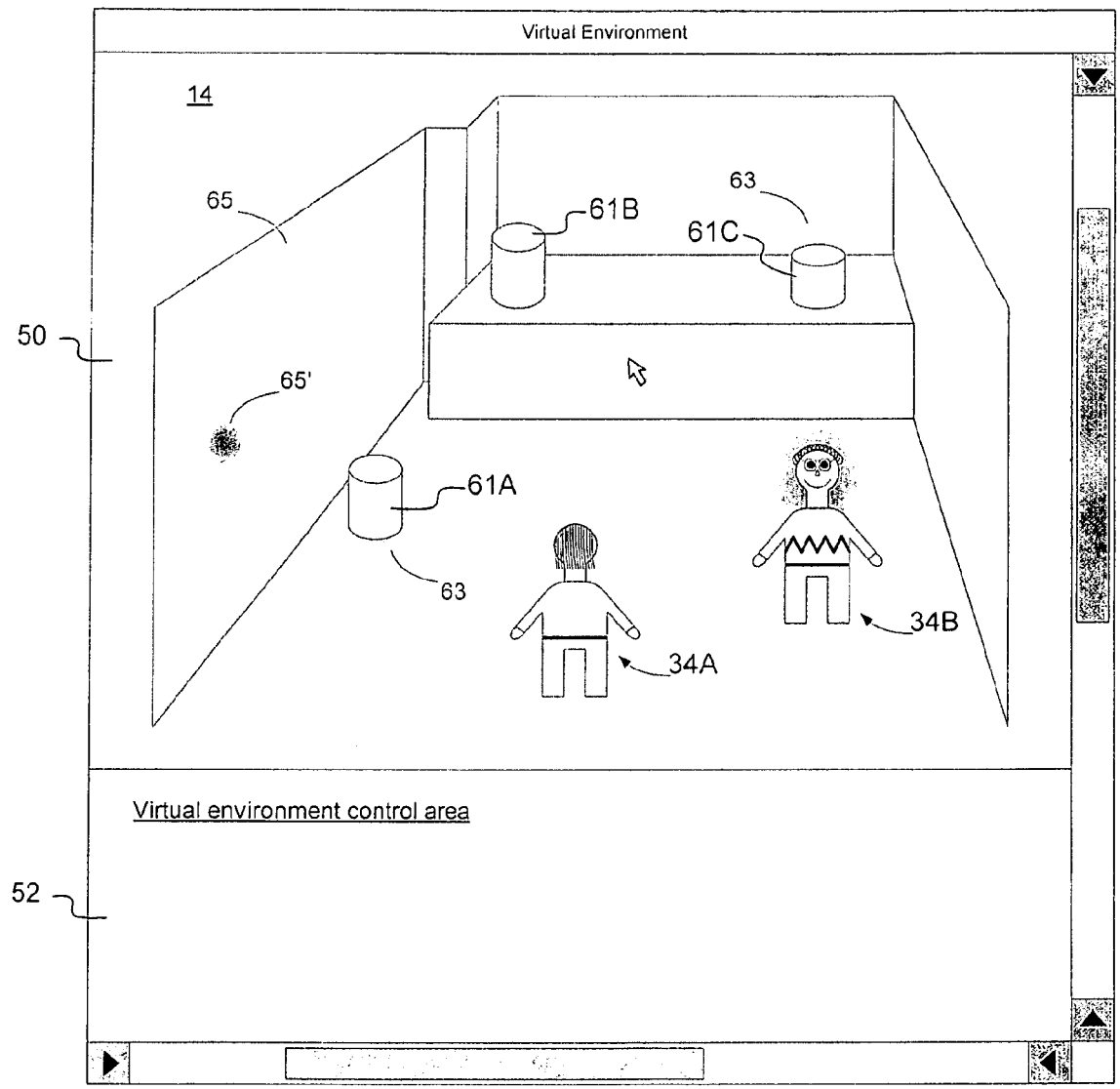

FIG. 6 shows an optional feature, in which objects are provided with a visual indicia whenever there is one or more information URLs associated with the object. As shown in FIG. 6, the objects may be provided with a halo effect indicating that they are interactive objects and that additional information may be obtained about the objects via the overlay rendering web engine. In the illustrated example, objects 61A and 61C have auras 63 and, hence, are interactive objects. Object 61B, by contrast, does not have an aura and, hence, is not indicated as having an information URL.

An information URL is also located on one of the walls of the virtual environment 65. Hence, an aura 65' has been provided on the wall. The information URL on a surface may be used to provide information as to what is located behind the surface or to provide other information about the virtual environment itself, rather than information about objects contained in the virtual environment. When the user clicks on the information URL associated with the surface of the virtual environment, the overlay web rendering engine will render a web page containing information about the virtual environment, such as directions, help, or other information that may guide the user of the virtual environment or provide the user with additional information about the virtual environment itself. For example, if the user found a door and could not get through the door, the user may click on an information URL associated with the door to cause an overlay web page to appear. The overlay web page may instruct the user that they need to acquire a key and show them a map of the virtual environment with a highlighted location of where a key may be found. Alternatively, the overlay web page may provide the user with information as to what lies behind the door so that the person is able to determine whether they really want to open the door. Many different types of information about the virtual environment may be provided in this manner to enable the user to learn about the virtual environment, its characteristics, and how to better use the virtual environment.

The information about the virtual environment may be provided by the virtual environment itself or, alternatively, may be provided by other users of the virtual environment. For example, users of the virtual environment may be allowed to add URLs to the virtual environment to provide information to other users of the virtual environment. To enable this type of interaction, a URL handler may be provided to receive URLs from users and push additional information URLs to the 3D virtual environment to enable additional URLs to be included in the 3D virtual environment. Thus, additional URLs may be added to the virtual environment as desired to cause the additional URLs to be made available to other users of the virtual environment. For example, when a user discovers how to get past a particular feature of the virtual environment, the user may post a tip on a web page. The user may then push a link to the web page into the virtual environment and have the URL for the link attach to the feature of the virtual environment. Subsequent users that encounter the feature may try to get past the feature without looking at the tip or, if desired, may use the information URL to access the external web page to learn information about the particular feature from the previous user. This may help foster a community of users collectively attempting to overcome obstacles in the virtual environment. Alternatively, dynamic page generation technology may be used to simply allow the user to update the page that is already referred to by the URL. When subsequent users encounter the URL they may cause the updated web page to be overlayed to obtain the most recent version of the web content.

Figure 7:
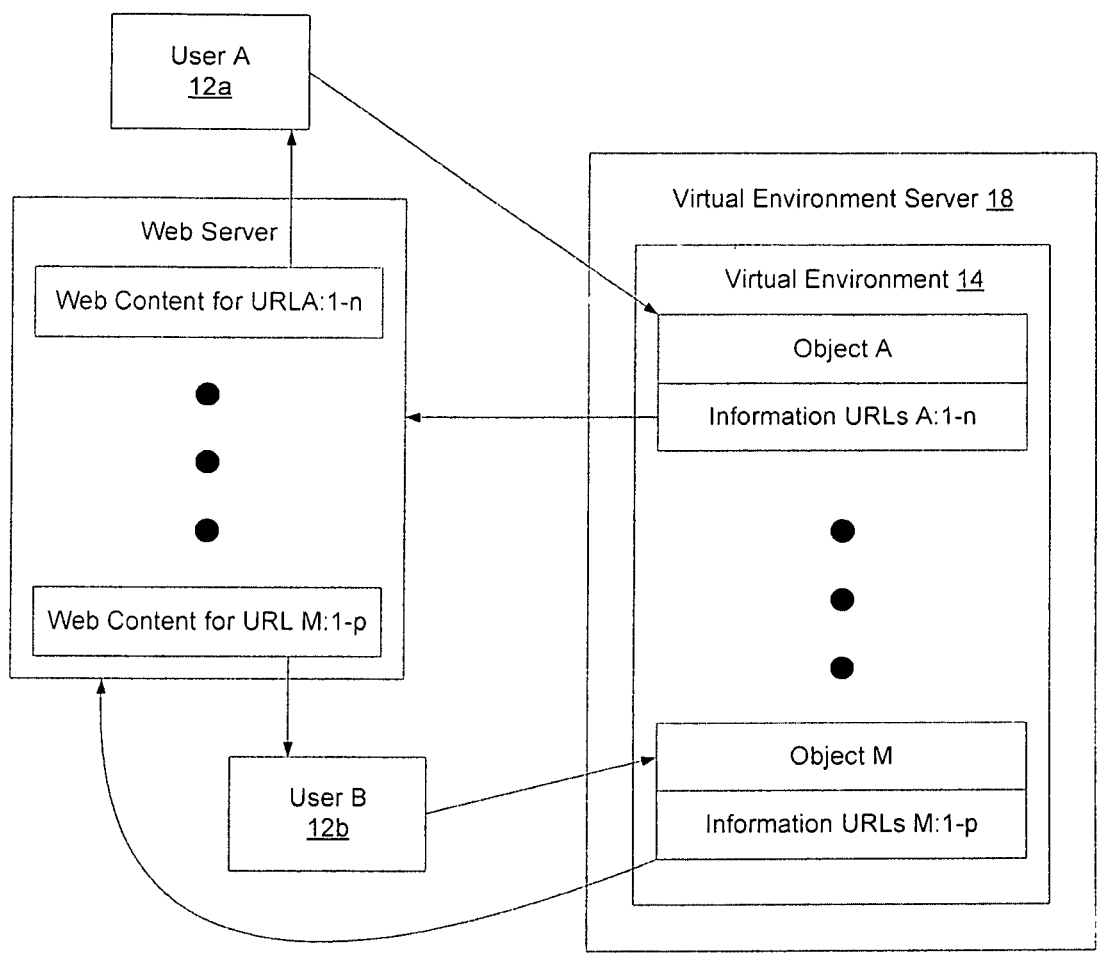
FIG. 7 is a functional block diagram illustrating the interaction between several of the components of FIG. 1 according to an embodiment of the invention.
Figure 8:
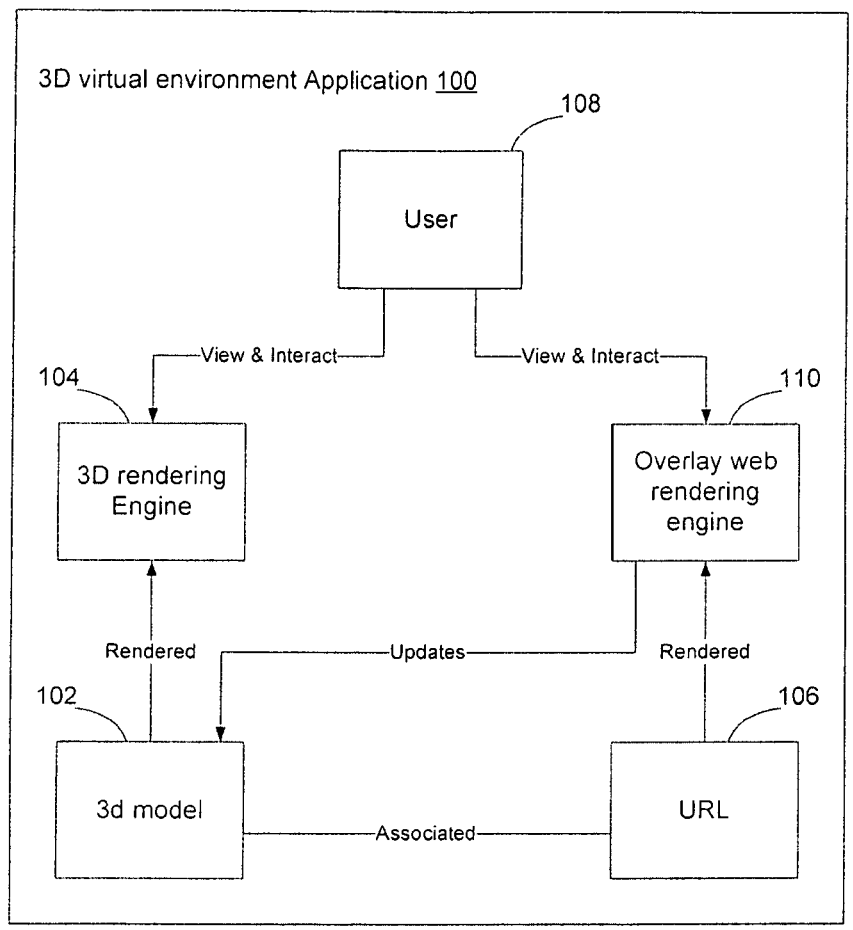
FIG. 8 is a functional block diagram illustrating the interaction of the user with various pieces of content according to an embodiment of the invention.

FIG. 7 shows several of the components of FIG. 1 in greater detail and shows the interrelationship between the various components. FIG. 8 similarly shows how the objects interact with each other to enable web content to be included as an overlay to the virtual environment. As shown in FIG. 7, the virtual environment server 18 renders the virtual environment 14. Included within the virtual environment are numerous objects (objects A through M), some of which have information URLs associated therewith. For example, object A has information URLs A: 1-n, and object M also has information URLs. M: 1-p Assume that user A is looking at Object A and would like to have additional information about object A. User A may click on object A or otherwise select one of the information URLs associated with object A. Clicking on the URL will be detected by the virtual environment server which will generate a JavaScript call to launch an overlay web rendering engine. The web content for the URL will be obtained from a web server, downloaded to the user, and stored on the user's computer. The web content will then be rendered as an overlay to the three dimensional virtual environment using the overlay web rendering engine. User 12B may access different web content associated with the same or a different object in a similar manner. Thus, each user of the virtual environment may obtain more information about objects contained in the virtual environment as needed without affecting the other users of the virtual environment.

FIG. 8 shows another view of how the components interact to enable web content to be included as an overlay to a three dimensional virtual environment. As shown in FIG. 8, a three dimensional virtual environment application 100 has a three dimensional model 102 that is rendered using a 3D rendering engine 104. Information URLs 106 are associated with the 3D model and included in the 3D rendered presentation that is shown to the user 108.

The user 108 may view and interact with the 3D image shown by the 3D rendering engine 104. When the user interacts with one of the URLs 106, an overlay web rendering engine 110 will render the web page associated with the URL. The user may view and interact with the content of the web page to obtain additional information associated with other URLs available through the rendered web page. Additionally, the user may interact with the content of the web page to update the 3D model to thus affect the 3D rendered presentation that is provided.

Interaction with the web content may influence and change the virtual environment and, similarly, actions in the virtual environment may cause updated web content to be provided. For example, the user may click on a link in the web page to cause an aspect of an object to be emphasized in the virtual environment. Similarly, the user may manipulate the object in the virtual environment to turn the object, etc., to cause different web content for the different aspects of the object to be provided in the overlay. One way of enabling web content and virtual environments to be interrelated in this manner is disclosed in greater detail in U.S. patent application Ser. No. 12/344,562, filed Dec. 28, 2008, entitled *Method and Apparatus for Interrelating Virtual Environment and Web Content*, the content of which is hereby incorporated herein by reference. Other ways of enabling this functionality may be implemented as well.

Although particular modules and pieces of software have been described in connection with performing various tasks associated with enabling external content to be included in a three dimensional computer-generated virtual environment, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-implemented method of providing content in the context of a three-dimensional virtual environment, the method comprising the steps of:
    detecting that a center point of an Avatar's point of view is focused on a three dimensional object within the three dimensional virtual environment, the three dimensional object having an associated information Uniform Resource Locator (URL) providing a link to content external to the three dimensional virtual environment;
    using the link to obtain the content external to the three dimensional virtual environment automatically upon determining that the center point of the Avatar's point of view has been focused on the three dimensional object for a first period of time, the step of using the link to obtain the content occurring automatically upon expiration of the first period of time without requiring further interaction between the Avatar and the three dimensional object;
    using an overlay web rending engine to display the content associated with the information URL in a web page as an overlay to the three dimensional object over or near the three dimensional object; and
    using a JavaScript-to-plug-in interface to provide direct interaction to 3D functions from the web page;
    wherein the application supporting the three dimensional object is a three-dimensional virtual environment application which enables a three dimensional virtual environment to be provided to a user;
    wherein the web page has at least a semi-transparent background to enable both the content associated with the information URL and the three-dimensional virtual environment to be visible such that the content associated with the information URL may be viewed in context of the three dimensional object; and
    wherein the content includes dynamically rendered callouts connecting information elements in the content with corresponding specific aspects of the three dimensional object within the three dimensional virtual environment, each callout having an end that is attached to the object at a corresponding particular point.

2. The method of claim 1, wherein display of the content requires the user to have a plugin associated with a local web browser.

3. The method of claim 1, further comprising the step of highlighting three dimensional objects within the virtual environment which have an associated information URL.

4. The method of claim 3, wherein the step of highlighting occurs when the center point of the Avatar's point of view first focuses on the three dimensional objects within the three dimensional virtual environment.

5. The method of claim 1, wherein the three dimensional virtual environment is a shared virtual environment used by many users, and wherein the content is only rendered for one of the users and not visible to the other users of the shared virtual environment.

6. A computer-implemented method of providing content in the context of a three-dimensional virtual environment, the method comprising the steps of:

detecting interaction between an Avatar and a three dimensional object within the three dimensional virtual environment, the three dimensional object having an associated information Uniform Resource Locator (URL) providing a link to content external to the three dimensional virtual environment;

using an overlay web rending engine to display the content associated with the information URL in a web page as an overlay to the three dimensional object over or near the three dimensional object; and using a JavaScript-to-plug-in interface to provide direct interaction to 3D functions from the web page;

wherein the application supporting the three dimensional object is a three-dimensional virtual environment application which enables a three dimensional virtual environment to be provided to a user;

wherein the web page has at least a semi-transparent background to enable both the content associated with the information URL and the three-dimensional virtual environment to be visible such that the content associated with the information URL may be viewed in context of the three dimensional object, and wherein the content includes dynamically rendered callouts connecting information elements in the content with corresponding specific aspects of the three dimensional object within the three dimensional virtual environment, each callout having an end that is attached to the object at a corresponding particular point.

7. The method of claim 6, wherein the callouts in the content move in connection to movement of the three dimensional object in the three dimensional virtual environment to dynamically consistently connect between regions of a viewing plane containing the information elements in the content and the corresponding particular points on the three dimensional object as the three dimensional object moves within the virtual environment.

8. The method of claim 6, wherein the content associated with the information URL is panned such that it remains over the three dimensional object if the user changes a point of view relative to the three dimensional object.

9. The method of claim 6, wherein the content is interactive, such that a user can click on elements of the content to cause the content to be updated.

10. A computer-implemented method of providing content in the context of a three-dimensional object, the method comprising the steps of:

detecting interaction between an Avatar and the three dimensional object via an application supporting display of the three dimensional object, the three dimensional object having an associated information Uniform Resource Locator (URL) providing a link to content external to the application;

using an overlay web rending engine to display the content associated with the information URL in a web page as an overlay to the three dimensional object over or near the three dimensional object;

enabling a user of to change the information URL associated with the object; and using a JavaScript-to-plug-in interface to provide direct interaction to 3D functions of the application from the web page;

wherein the application supporting the three dimensional object is a computer aided design (CAD) software application which enables a three dimensional virtual environment to be provided to the user of the three dimensional virtual environment;

wherein web page has at least a semi-transparent background to enable both the content associated with the information URL and the three-dimensional virtual environment to be visible such that the content associated with the information URL may be viewed in context of the three dimensional object; and wherein the content includes dynamically rendered callouts connecting information elements in the content with corresponding specific aspects of the three dimensional object within the three dimensional virtual environment, each callout having an end that is attached to the object at a corresponding particular point.

11. The method of claim 10, wherein the step of enabling the user to change the information URL comprises enabling the user to replace the information URL with a new information URL.

12. The method of claim 10, wherein the step of enabling the user to change the information URL comprises enabling the user to add information to the content associated with the information URL.

13. The method of claim 10, further comprising enabling the user to add a new information URL to a second three dimensional object displayed by the application.

14. The method of claim 10, further comprising enabling the user to specify content associated with the new information URL to enable the user to provide the specified content to other users of the application.

15. The method of claim 10, further comprising the steps of enabling the user to interact with the content on the web page, capturing the interaction with the content on the web page, and using the captured interaction to affect the three dimensional object displayed by the CAD software application.

16. The method of claim 15, wherein the step of capturing the interaction with the content on the web page causes events to be sent to the application supporting the three dimensional object via the JavaScript-to-plug-in interface.

17. The method of claim 1, wherein the information URL is associated with a particular aspect of the object.

18. The method of claim 17, wherein multiple information URLs are associated with the object, each of the multiple information URLs being associated with a different particular aspect of the object.

19. The method of claim 1, further comprising the steps of enabling the user of the three dimensional virtual environment to interact with the content on the web page, capturing the interaction with the content on the web page, and using the captured interaction to affect the three dimensional object within the three dimensional virtual environment.

20. The method of claim 19, further comprising the steps of enabling the user of the three dimensional virtual environment to interact with the object in the three dimensional virtual environment, capturing the interaction with the object, and using the captured interaction with the object to affect the content shown on the web page.

21. The method of claim 1, wherein the object is rendered using a server outside of a server supporting the three dimensional virtual environment.

22. The method of claim 1, wherein the 3D functions include point of view control and object property controls.

23. The method of claim 1, wherein the object is an Avatar.

24. The method of claim 1, wherein the object is a wall in the virtual environment; and wherein the content is information about the virtual environment.

25. The method of claim 24, wherein the information about the virtual environment comprises information describing characteristics of the virtual environment, or instructions how to use the virtual environment.

* * * * *